US010955056B2

(12) United States Patent
Schoening (10) Patent No.: US 10,955,056 B2
(45) Date of Patent: Mar. 23, 2021

(54) APPARATUS FOR OFFSHORE WORK COMPRISING A GEAR MOTOR

(71) Applicant: SCHOENING GMBH, Dortmund (DE)

(72) Inventor: Markus Schoening, Dortmund (DE)

(73) Assignee: SCHOENING GMBH, Dortmund (DE)

( * ) Notice: Subject to any disclaimer, the term of this patent is extended or adjusted under 35 U.S.C. 154(b) by 0 days.

(21) Appl. No.: 16/263,105

(22) Filed: Jan. 31, 2019

(65) Prior Publication Data
US 2019/0234517 A1 Aug. 1, 2019

(30) Foreign Application Priority Data
Jan. 31, 2018 (DE) .......................... 2020 1 8100532

(51) Int. Cl.
| | | |
|---|---|---|
| E21B 7/12 | (2006.01) | |
| E21B 7/124 | (2006.01) | |
| E21B 41/00 | (2006.01) | |
| F16J 15/34 | (2006.01) | |
| F16J 15/46 | (2006.01) | |
| F16H 57/029 | (2012.01) | |

(Continued)

(52) U.S. Cl.
CPC .......... *F16J 15/344* (2013.01); *F16H 57/029* (2013.01); *F16J 15/3448* (2013.01); *F16J 15/46* (2013.01); *F16H 57/0479* (2013.01); *F16H 2057/02039* (2013.01)

(58) Field of Classification Search
CPC ........ E21B 7/12; E21B 7/124; E21B 41/0007; F16J 15/344; F16J 15/3448; F16J 15/46; F16H 57/029
See application file for complete search history.

(56) References Cited

U.S. PATENT DOCUMENTS

| | | | | |
|---|---|---|---|---|
| 1,396,885 A | * | 11/1921 | Sanchez | B63C 11/52 405/188 |
| 6,585,228 B1 | * | 7/2003 | McCaskill | F16K 31/004 251/129.13 |

(Continued)

FOREIGN PATENT DOCUMENTS

| | | |
|---|---|---|
| DE | 1815040 | 6/1970 |
| DE | 2313388 | 10/1974 |
| DE | 4127074 | 2/1993 |

OTHER PUBLICATIONS

Search Report for German Patent Application No. 202018100532.4, dated Nov. 2, 2018, 3 pages.

*Primary Examiner* — Matthew R Buck
(74) *Attorney, Agent, or Firm* — Sheridan Ross P.C.

(57) ABSTRACT

Device for offshore work by machining tools, such as cutters, saws, drills and the like, with a geared motor comprising a drive, a drive coupled to the transmission and at least one multi-part housing for receiving the drive and transmission, wherein the transmission at least one through the Housing leading to the outside shaft, in particular output shaft (18), to which the machining tool outside the housing can be connected, characterized in that the geared motor is equipped by a waterproof designed housing enclosure for underwater operation, wherein the housing parts along their joining surfaces by sealing means, in particular sealing rings, and the housing on the drive side and driven side rotating surfaces, in particular shafts relative to the housing (4) are sealed by pressurizable ring seals.

12 Claims, 8 Drawing Sheets

(51) Int. Cl.
  *F16H 57/04* (2010.01)
  *F16H 57/02* (2012.01)

(56) References Cited

U.S. PATENT DOCUMENTS 8,752,674 B2 * 6/2014 Tomter ................ F04D 29/0513
                                                184/6.16
2016/0146348 A1 * 5/2016 Van Opstal ............ F16J 15/004
                                                277/307

* cited by examiner

APPARATUS FOR OFFSHORE WORK COMPRISING A GEAR MOTOR

CROSS-REFERENCE TO RELATED APPLICATIONS

This application claims the benefit of German Patent Application No. 20 2018 100 532.4 filed Jan. 31, 2018, the entire contents of which are incorporated herein by reference.

FIELD

The invention relates to an apparatus for offshore work by means of machining tools, such as milling cutters, saws, drills, and the like, having a gear motor comprising a drive, a gear coupled to the drive and at least one multi-part housing for receiving drive and gear, wherein the gear has at least one shaft leading to the outside through the housing, in particular the output shaft, to which the machining tool can be connected outside of the housing, wherein the gear motor is equipped with a waterproof-designed housing encapsulation for underwater operation, wherein the housing parts are sealed along their joining surfaces by sealing means, in particular sealing rings, and rotating surfaces are sealed on the driving side and driven side on the housing, in particular shafts, relative to the housing by pressurizable annular seals.

In detail, the invention relates to apparatus for offshore work using tools, such as mills, saws, drills and the like, and gear motors. Cases of application of this offshore work is work on stationary oil platforms, on wind turbines of wind farms, during laying of pipelines and cables, and the like. Here, it is necessary to use milling, sawing or drilling tools depending on the processing, such that, for example, rock, sand formation and the like can be processed under water where by nature corresponding tailings are processed, the small particles of which are forming an emulsion with water such that corresponding sludge formation can result.

If it is possible to employ conventional processing apparatus in rivers, lakes and like waters by introducing corresponding sheet pile walls, this is not possible in case of offshore applications. Instead it is necessary to work correspondingly far under water or under sea surface depending on the depth of the processing site. In addition, sea water is extremely aggressive due to its salt component and, therefore, choosing the right materials and components that are in contact with the product is important for the service life of the overall system.

Therefore, such apparatus are sealed for moving parts using sliding seals, in particular mechanical face seals, which, however, is generally no longer sufficient for offshore work and when working below a controlled submersible water depth of more than 5 m. Consequently, particles and impurities are pressing into the relatively movable components of the apparatus depending on processing depth with the result that the service life of such devices is considerably reduced. In particular, the seals of such apparatus are affected by this, which frequently cannot withstand the pressure and aggressive media for prolonged periods of use.

It is the object of the invention to provide an apparatus for offshore use by specifically using tools, such as mills, saws, drills and the like, where after a long service life it should be possible, according to another aspect, that different water depths can be bridged with the apparatus without great effort.

This object is solved by the features included in the characterizing part of claim 1.

Convenient further developments of the invention are a result of the features specified in the dependent claims.

According to the invention, at least one gear motor is used in the apparatus of the invention for offshore applications with machining tools, such as mills, saws and drills, on the output shaft of which the corresponding tool can be flange-mounted or connected, respectively. According to the invention, the gear motor, which comprises a drive motor, which is essentially an electric motor, and a transmission, is covered for equipping for underwater use in the offshore area with an encapsulated housing against ingress of water and mud, where drive and transmission are accommodated in a housing or the drive, and the transmission are each accommodated in a separate housing element. These housings are of multipart, generally two-piece construction to accommodate the components of the engine and the transmission accordingly. Here, the housing parts are suitably assembled along their joining surfaces and usually attached to each other by screwing, for example. According to the invention, sealing means, in particular sealing rings or low-profile sealing elements, are provided in the area of connecting or joining surfaces, respectively, of the housing parts for the purpose of outward encapsulation, by which a watertight sealing of the interior against sea water is guaranteed while also taking into consideration the pressure conditions in respective depths. Watertight sealing in the context of the present application means that the interior of the housing comprising drive and transmission is also securely protected in corresponding water depths against water ingress and also against ingress of foreign bodies, mud and similar emulsions. According to the invention, the surfaces rotating on the driving side and driven side, in particular shafts, are additionally sealed against the housing preferably by pressurized annular seals. This pressure setting is important because due to pressure variability pressure differences between the environment and the interior of the housing receiving drive and transmission can be compensated. According to another aspect, corrosion-resistant materials, such as stainless steel and high-alloy steels, and metals, are used for the housing gear and/or drive components.

In case gear motors are equipped according to the above measures, it is possible to use corresponding standard gear motors here, which are generally constructed of an electric motor and a suitable transmission, where all types of gears can come into use, such as angle gears, spur gears, planetary gears with hollow shaft or solid shaft, depending on the corresponding application.

It is important here, that because of such equipment of standard gear motors, despite pressure differences when using such a sealing underwater in corresponding depths in the offshore region, the use of such gear motors is possible in the long term when used in corresponding depths, even taking into consideration the fact that the drive parts are operated under water and are subject to heavy soiling due to machining by milling, drilling, sawing and the like.

In a particularly advantageous embodiment of the invention, the pressurized annular seals for the rotating surfaces, in particular shafts, are pressurized by the transmission interior or via a pre-chamber preferably by a hydraulic pressure medium, such as oil, or an equivalent highly viscous pressurized pre-chamber barrier medium, in particular lubricants.

In terms of forming a pre-chamber for pressure equalization, it is convenient to provide the pre-chamber at the shaft distal side, i.e. from the rotating surface distal side of the drive seals, in particular the annular seal, and it is preferable to form the pre-chamber by a gap-shaped annular chamber.

Gap-shaped because in this way the pre-chamber can be made narrower without loss of its function of volume.

Conveniently, the pre-chamber can be adjusted to a pressure depending on the working depth, in which the machining tool such as milling cutter, drill, saw and the like is to be used, by supplying a pressure medium in order to compensate for the pressure differences relative to the water pressure.

According to the invention, there are two variants here, i.e., the pre-chamber may be pressurized in one case to a fixed predetermined working pressure by supplying a corresponding pressure medium into the pre-chamber and, thus, the ring seal may be pressurized. The supply of pressure medium takes place here via an opening which then may be closed by a plug or the like. Alternatively, the pre-chamber can be supplied externally with a pressure medium via a pressure medium supply line, which allows for a variable pressure adjustment in the pre-chamber on the outside by a corresponding supply of pressure medium. Thereby, a variable and dynamic pressure adjustment is achieved depending on corresponding working depths of the gear motor.

The ring seal may be conveniently realized by mechanical drive seals. Particularly suitable are mechanical face seals in form of two adjacent, functionally composed, metallically encapsulated seals, each of which is conveniently constructed bipartite, namely bipartite in functional terms, i.e., a seat ring and a sealing ring provided radially outside of the seat ring and disposed in the seat ring, where the sealing ring has the function to bias and dynamically seal the system. Here, it is possible to realize the two adjacent sealing rings in one piece or in two parts. Metallic encapsulation means that the interacting sealing rings are entrapped in a metal housing both in a one-piece and two-piece embodiment.

Here, it is convenient here that the seat ring and particularly the seal are formed by a wear-resistant elastomer.

According to the invention, the gap space, i.e. the pre-chamber, is floatingly mounted to the outer medium and sealed by a non-connected wear ring or sealing ring, respectively, which compensates for high pressure differences. This gap space can be filled up in a pressurized manner with a corresponding pressure medium, such as oil, or a paste-like lubricant. The utilization of the gap space with the filled liquid results in that damaged drive parts may not be incorporated. A passage of fine particles is prevented by the enclosing amount of lubricant and no wear of the seal takes place by the generated pressure differential. Furthermore, the entire system can be operated in a balanced manner by specifically controlled pressure differences which are defined according to the place of use, in particular the operating depth.

The joining surfaces of the respective multi-part, in particular two-part, housings may be conveniently formed with grooves, adapted to receive the seals, into which the sealing rings can be securely inserted, so to speak partially chambered, wherein the sealing rings, particularly O-rings, are protruding beyond the respective joint surfaces such that the seal is deposited during assembly of the mounting of the respective housing parts, either by screws in the flange and the generation of restoring forces, and is thus pre-stressed. This results in an automatic equalization of pressure differences. Alternatively, flat profiled sealing elements can be used. Conveniently, the joint surface is to be offset via at least one shoulder, especially via circumferential shoulders in the interior of the joint surfaces, and to form a labyrinth seal therewith, which conveniently can be achieved together with the above seal rings and sealing elements.

BRIEF DESCRIPTION OF THE DRAWINGS

Embodiments of the invention will be described with reference to the Figures, in which.

DETAILED DESCRIPTION

Figure 1:
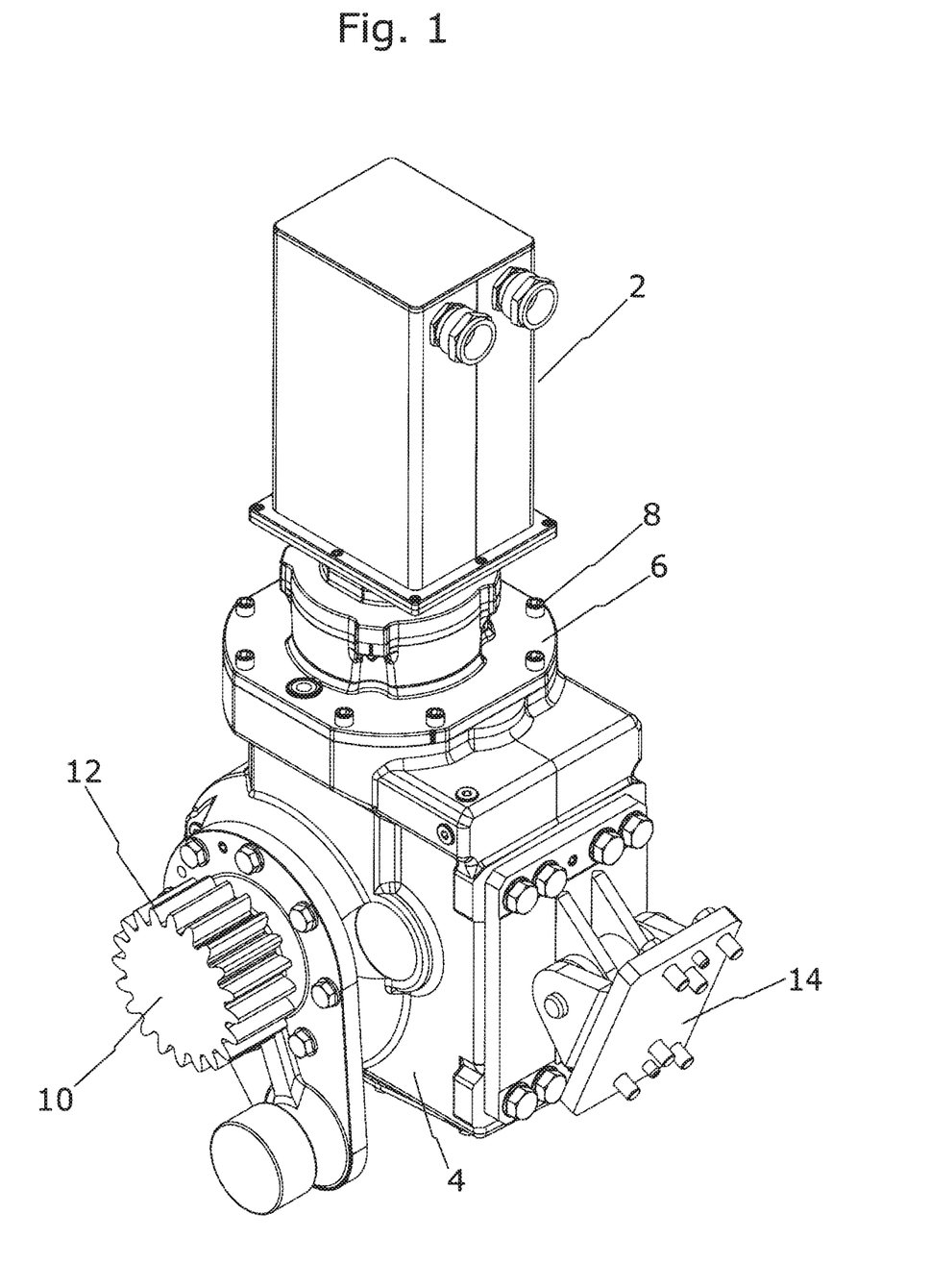
FIG. 1 is a perspective view of a gear motor.

FIG. 1 shows, purely by way of example, a gear motor suitable for the inventive scope of application, where equipped according to the invention any standard gear motor is usable, in principle, regardless of the particular drive and the particular structure of the transmission, so that all possible transmissions, such as planetary gears, bevel gear, and the like can be used for the invention. In that regard, no detailed description is necessary.

In FIG. 1 is seen the housing element 2 for the drive accommodated therein, for which purpose an electric motor is suitable. The housing element receiving the gearbox is designated by 4. In that regard, the gear motor is accommodated, so to speak, in two housing elements 2, 4 that are joined together here via flange plates 6 by a screw connection 8. As required, the engine and transmission can also be housed in a common housing. The housings are conveniently divided into multiple parts, in particular divided into two parts, to be able to easily accommodate the drive and gear components.

In FIG. 1 the output shaft 10 can be seen in which the machining tool is connected in a known manner. For the purpose of transmitting rotation to the tool, the output shaft 10 is equipped with a pinion 12, whereby any other suitable connection is also possible, for example via a spring-groove connection and the like, which is, however, not part of the invention. Only flange plates for fixing the gear motor to other units are represented by 14.

It is known and, therefore, need not be explained here separately that the drive motor accommodated in the housing 2 is coupled to the gear received in the housing 4 via an output shaft passing through the flange plate 6, wherein a corresponding increase or reduction of the rotational speed takes place via transmission, in order to operate the rotationally arranged tool at the output-side shaft 10 with desired speeds for processing purposes.

Figure 2:
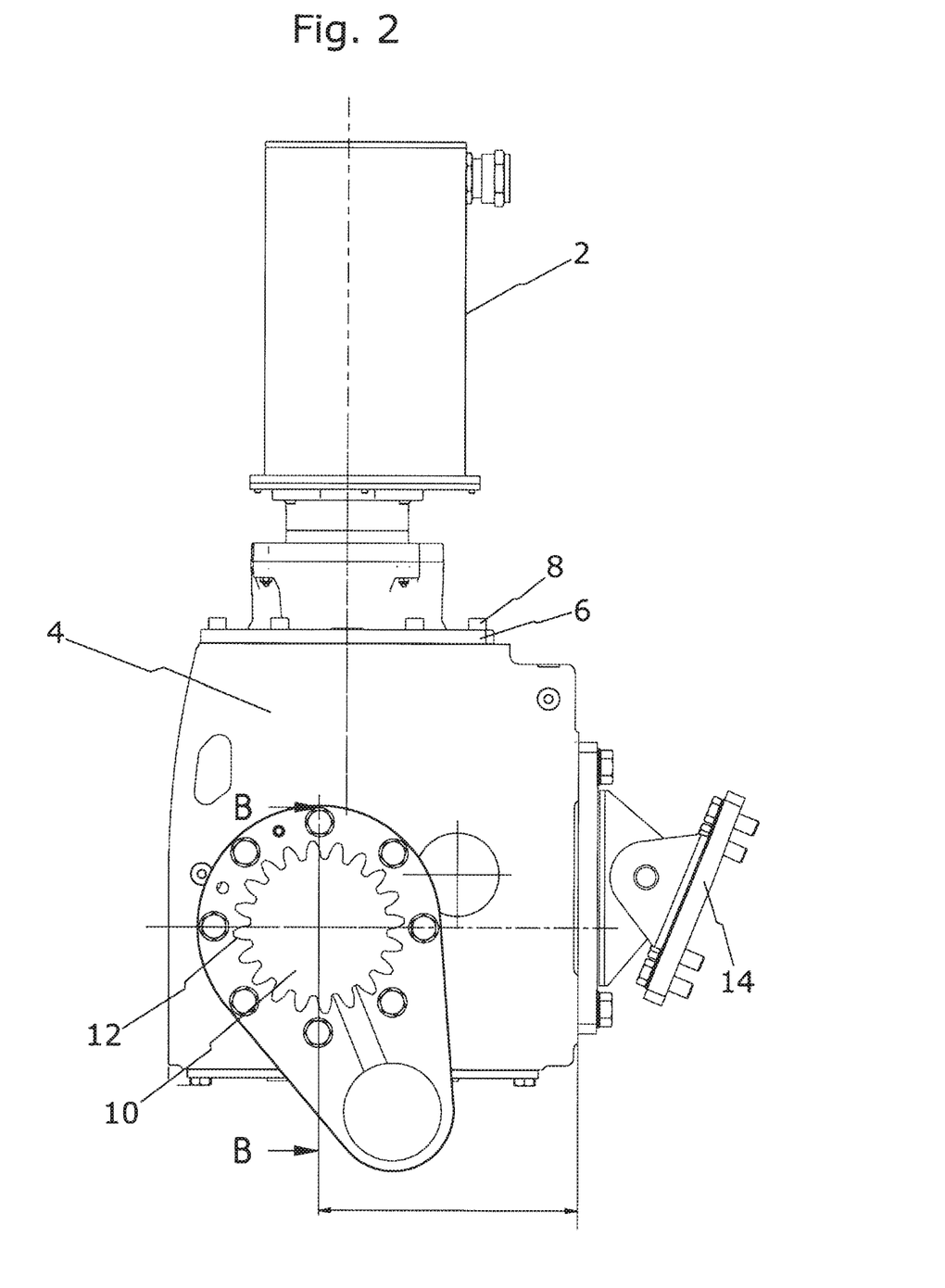
FIG. 2 is a side view of the gear motor according to FIG. 1.
Figure 3:
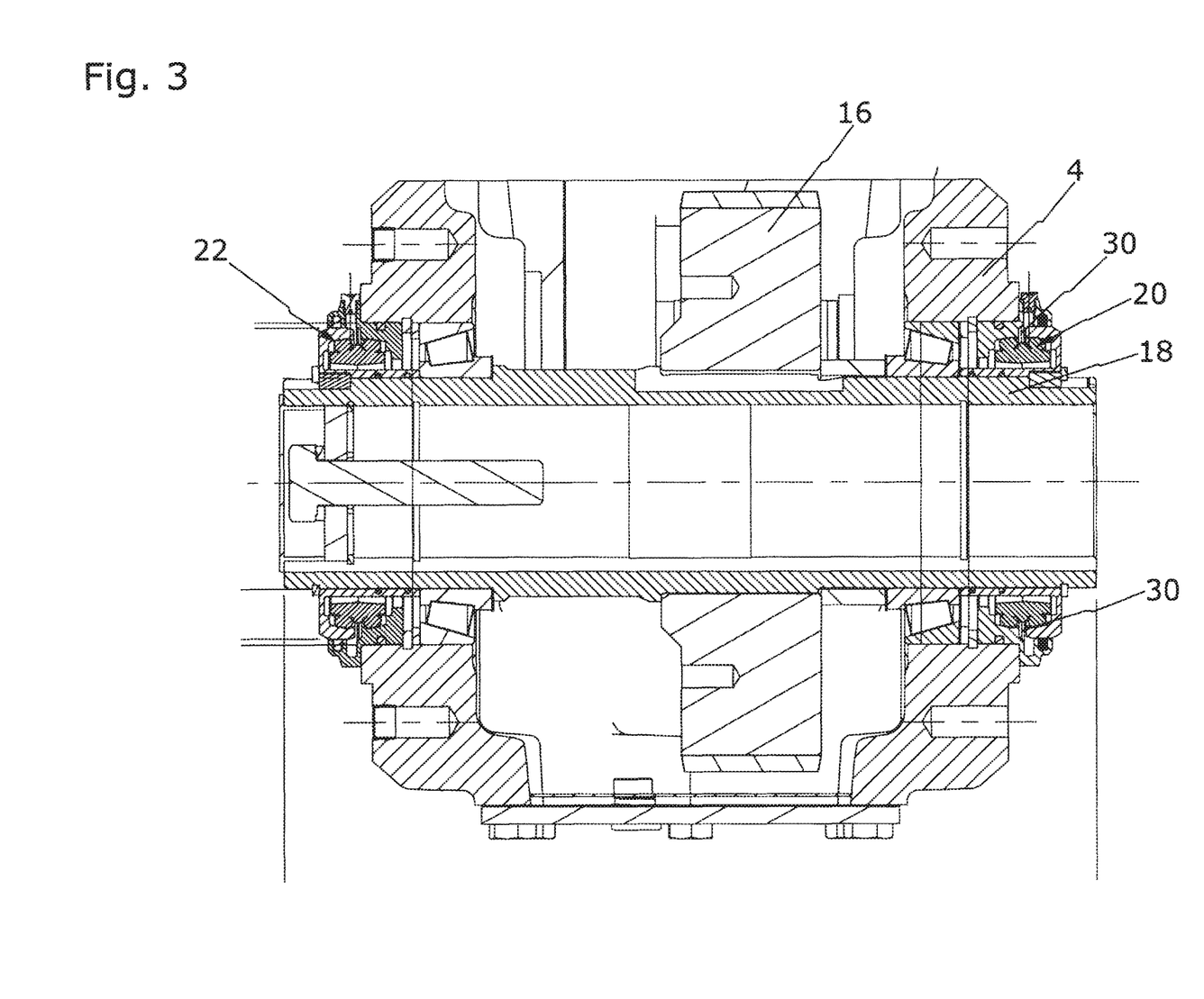
FIG. 3 is a partial section along the section line B-B in FIG. 2.

FIG. 3 shows a partial section along line B-B in FIG. 2, where the gearbox 4 from FIG. 3 can be seen. A part of the transmission, designated by 16, which is sitting on the shaft formed here as a hollow shaft 18 exiting on the right side of the housing 4, where the fastening tool is connected. On both sides of the shaft 18 there are drive seals 20, 22 to equip the gear motor for underwater use in the offshore sector, wherein embodiments of such mechanical face seals suitable for use in the invention are represented, for example, with reference to FIGS. 4 and 5.

Figure 4:
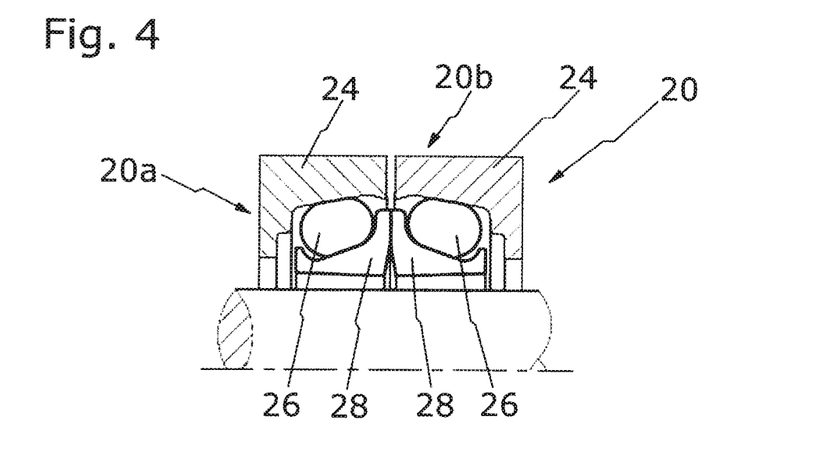
FIG. 4 is a suitable embodiment of a mechanical face seal.

As is apparent from FIG. 4, drive seals 20, 22 are suitable which can be put under corresponding pressure, but this must be considered only as exemplary. According to FIG. 4, two, in principle identical, metal seal rings 20*a*, 20*b* are provided that are closely arranged side by side in contact with one another and serve functionally as a drive seal. The sealing means are accommodated here each in a metallic housing 24 and each metallic sealing ring 20*a*, 20*b* has an O-ring 26 sitting on a respective seat ring 28 or is embedded in a corresponding recess, respectively, but is protruding over the seat ring. The seat rings 28 are arranged on metal, in particular hardened rings 29. Seat ring and O-ring are formed from a corresponding suitable material such as a wear-resistant elastomer. The identical metal seal rings existing in two separate housings have lapped bearing surfaces and are pressed here against each other and centered over the O-rings 26. One half of the mechanical drive seal, about half 20*a*, behaves statically in the application, while the other half, here for example 20*b*, rotates at the mating surfaces and is overall dynamically feathered.

Figure 5:
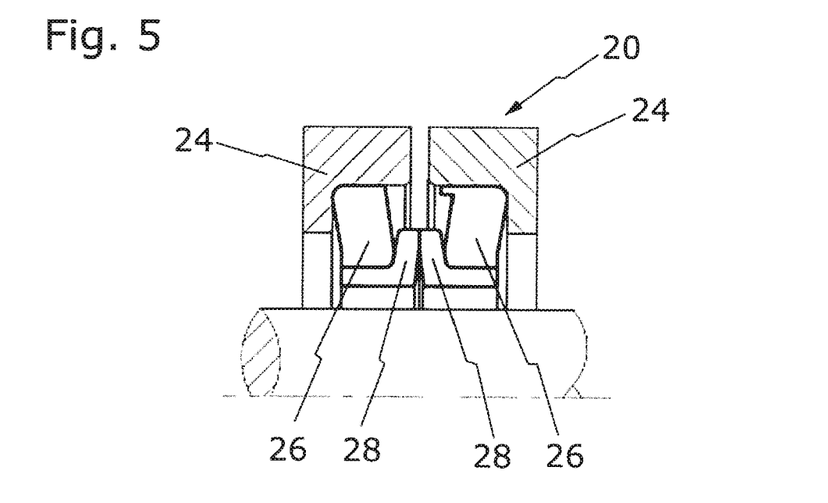
FIG. 5 is another alternative embodiment of a suitable drive and seal.

The drive seal according to FIG. 5 differs in principle only by the shape of the respective sealing elements where rings with a trapezoidal cross-section are now used as secondary sealing element in place of O-rings 26.

Figure 6:
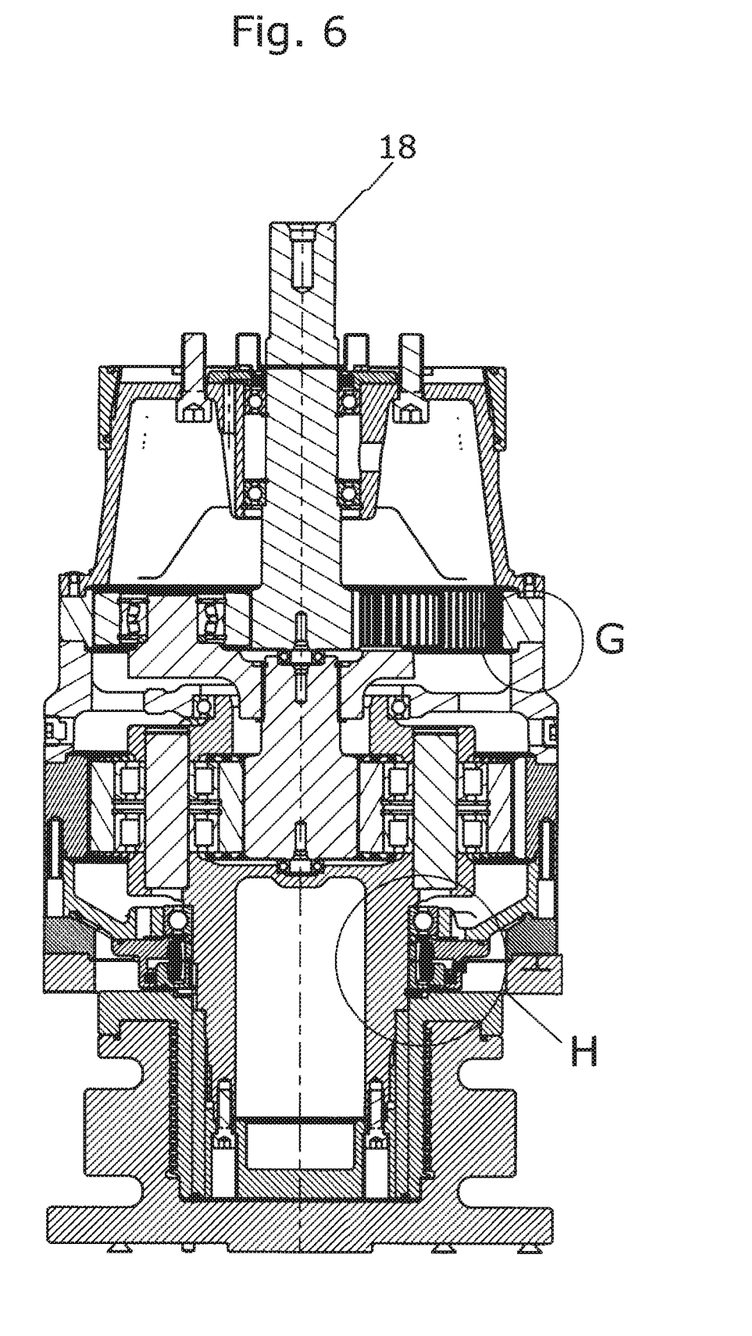
FIG. 6 is a sectional view through another embodiment of a gear motor in sectional view upgraded in accordance with the invention.
Figure 7:
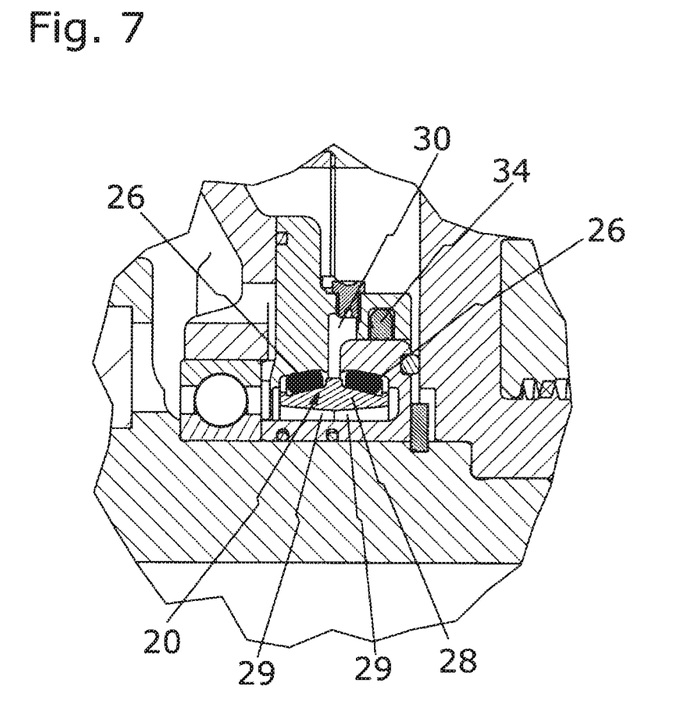
FIG. 7 is an enlarged view of the detail indicated by the inscribed circle in FIG. 6.

FIG. 6 shows another embodiment of a standard gear motor, which is, however, equipped in accordance with the invention for the specific application described, wherein the gear motor is shown in section. The drive shaft 18 is shown here as a shaft in full profile. FIG. 7 shows the drive seal represented twice in FIG. 6 with circle H in an enlarged view with the pre-chamber 30 formed as annular gap and the two-membered ring seal 20 here with a cured, preferably metallic seal ring 29 as a running ring and two sealing rings made of elastomer with reference numeral 26. The pre-chamber 30 is sealed by a plug 32 which forms the filling valve for the pressurized pre-chamber. Furthermore, a pressure-proof designed wear ring 34 is apparent from FIG. 7 serving as a rotary seal.

In an advantageous embodiment, the gap space or the pre-chamber 30, respectively, is floatingly mounted to the designing medium and closed by means of the non-connected wear ring 34 that compensates high pressure differences. Conveniently, this gap space can be filled in a pressurized manner with a suitably shaped lubricant or another suitable pressure medium such as hydraulic oil.

The utilization of the gap space or the pre-chamber, respectively, with lubricant or pressure medium, respectively, results in that damaged drive parts cannot be incorporated. A passage of fine particles is prevented by enclosing the amount of lubricant and no wear of the seal takes place at the seal by the additional pressure differential generated. Furthermore, the entire system can be operated in a balanced manner by specifically controlled pressure differences which are defined according to the place of use, in particular the desired insertion depth.

Figure 8:
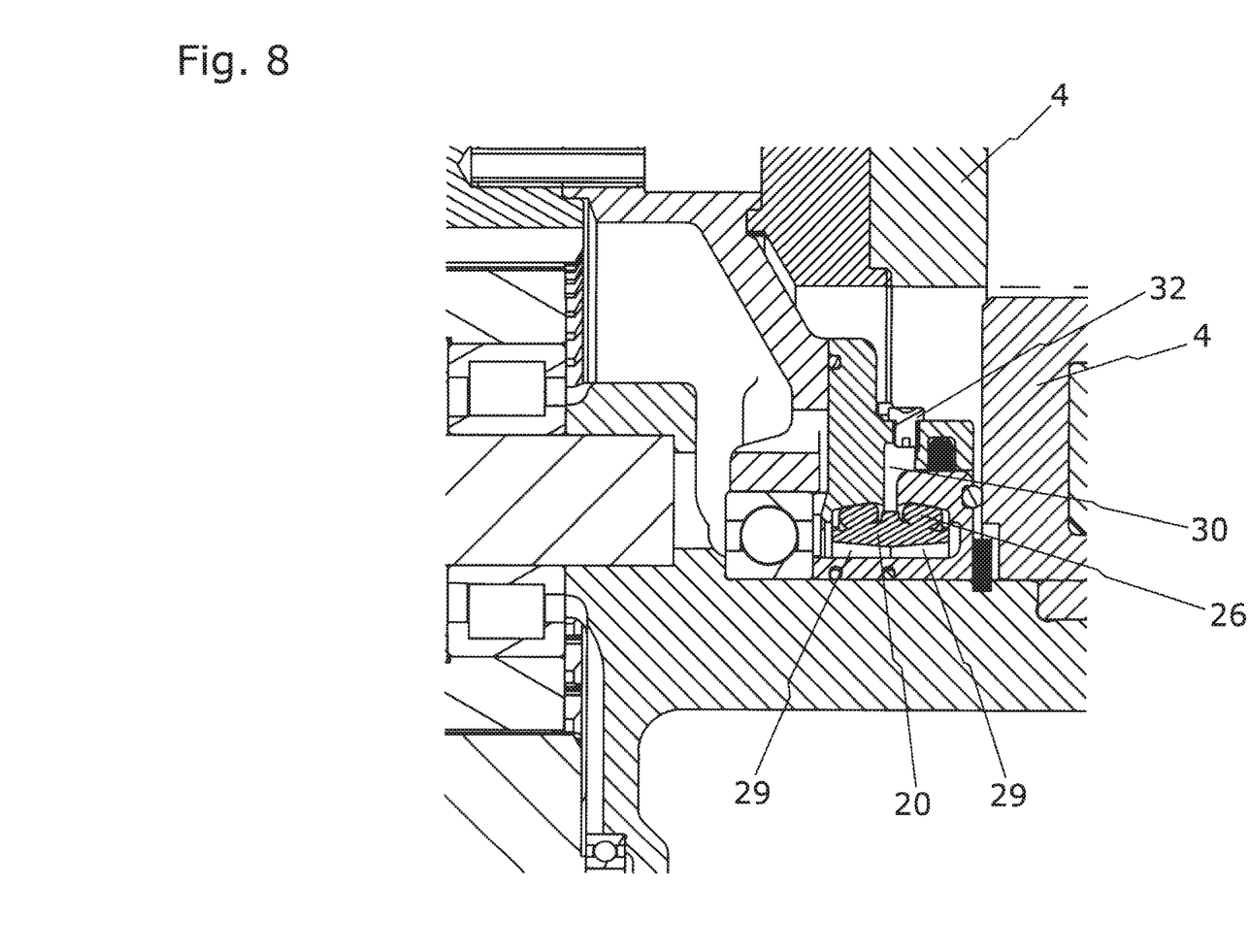
FIG. 8 is a partial sectional view in enlarged representation of a modified embodiment of an alternative to the representation in FIG. 7.

FIG. 8 shows an alternative design of the transmission of FIG. 6 compared to the embodiment according to FIG. 7, wherein only a partial section similar to FIG. 7 is shown. From FIG. 8, showing a somewhat modified gearbox, the gap-shaped pre-chamber 30 is quite clearly apparent which is annularly formed as a gap space and is in operative connection with the sealing ring integrally formed here. This pre-chamber 30 is filled with a suitable pressure medium, provided via an opening closed by a plug 32, such as a pasty lubricant or hydraulic oil of suitable viscosity, after which the plug is applied again. Thereby, the mechanical face seal can be set from the outside to a suitable pressure in order to compensate corresponding pressure differences depending on the working depth under water.

In an alternative modification, not shown here, however, a dynamic filling of the pre-chamber and, thus, a variable formation of the pressure conditions in the pre-chamber 30 is made according to working depth, wherein by means of a pressure medium supply line the pre-chamber 30 is connected to a respective pressure source, not shown here, so that a dynamic regulation can take place externally by a corresponding supply of pressure medium into the pre-chamber 30.

Figure 9:
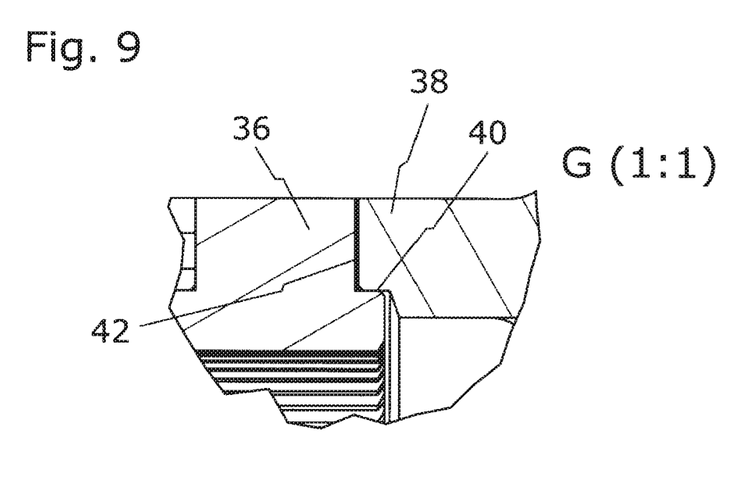
FIG. 9 is a partial section G according to FIG. 6 in enlarged representation for the sealed connection of the housing parts of the gear motor in accordance with the invention.

FIG. 9 shows a suitable embodiment of a seal of the joint surfaces of the housing parts for the purpose of encapsulation of the interior of the gear motor. The housing parts are denoted by 36 and 38. As is apparent, the joint surface has a shoulder 40 which is convenient in the context of the invention. A flat profiled sealing element shown in FIG. 9 in bold and denoted by reference numeral 42 is used here. This sealing element is designed such that it is pressure- and shockproof as well as water-resistant. In addition, this sealing has a high temperature resistance and is conveniently resistant to alkali and acid solutions as well. In the context of the invention, this housing seal is very advantageous for a tight encapsulation of the housing.

Figure 10:
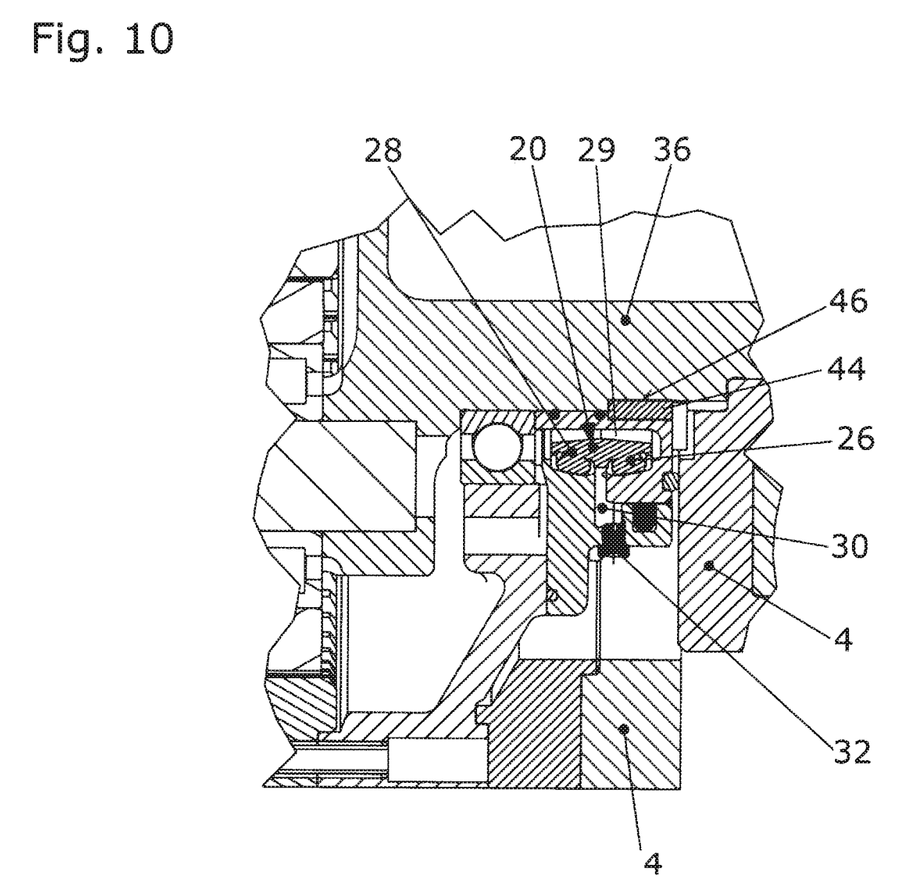
FIG. 10 is a partial section through an alternative transmission structure.

FIG. 10 shows a partial section through an alternative gear motor construction similar to FIGS. 7 and 8 having a unitary construction made of sealing rings 26 and seat ring 28 with hardened raceways 29. In this embodiment the race ring seal 20 is connected radially outward with the housing part 36 by at least one key 44 in a housing groove 46.

What is claimed is:

1. An apparatus for offshore work comprising:
    a gear motor comprising a drive, a gear coupled to the drive and at least one multi-part housing for receiving the drive and the gear, wherein the gear comprises an output shaft extending from the multi-part housing, to which a machining tool can be connected outside of the housing,
    wherein the gear motor comprises a waterproof housing encapsulation operable for underwater operation, wherein the multi-part housing comprises sealing rings operable to provide a seal between joining surfaces of the multi-part housing;
    wherein rotating surfaces of the output shaft are sealed on a driving side and a driven side on the housing by pressurizable annular seals; and
    wherein at least one of the pressurizable annular seals is pressurized by a hydraulic medium provided in at least one of an interior of the multi-part housing and a pre-chamber; and
    wherein the pre-chamber is provided radially outward of the pressurizable annular seals with respect to the output shaft and comprises an annular chamber.

2. Apparatus according to claim 1, wherein the pre-chamber is adjustable to a pressure by supplying pressure medium by which pressure differences depending on the predetermined working depth are compensated relative to the water pressure outside of the housing.

3. Apparatus according to claim 2, wherein the pre-chamber is set to a fixed predetermined working pressure by a corresponding pressure medium supply into the pre-chamber via an opening closable by a plug.

4. Apparatus according to claim 2, wherein the pre-chamber is fed via a pressure medium supply line with pressure fluid from a compressed air source provided outside of the gear motor, so that a variable and dynamic pressure setting is made possible externally by a corresponding pressure fluid supply to the pre-chamber or to the housing interior in adaptation to different insertion depths.

5. Apparatus according to claim 1, wherein the annular seals are formed by mechanical drive seals.

6. Apparatus according to claim 5, wherein the drive seals are formed by two adjacent, functionally composed, metallically encapsulated seals, each of which is constructed bipartite, comprising a seat ring and a sealing ring radially arranged outside and received in the seat ring.

7. Apparatus according to claim 6, wherein the seat ring and the sealing ring are constructed in one piece or in two parts and the seat ring is formed of a metallic material and the sealing ring is formed by a wear-resistant elastomer or both are formed by a suitable elastomeric material.

8. Apparatus according to claim 1, wherein the joining surfaces of the assembled housing parts are sealed by means of prestressed sealing rings.

9. Apparatus according to claim 8, wherein the joining surfaces have complementary or cross-section adapted grooves into which the sealing rings are inserted so that the sealing rings project beyond the respective joining surfaces, so that the sealing rings are deposited, during assembly and securing of the corresponding housing parts to form the housing and to generate elastic restoring forces, and biased thereby.

10. Apparatus according to claim 8, wherein flat profiled sealing members are provided for sealing the joining surfaces.

11. Apparatus according to claim 8, wherein the joining surfaces are offset from each other at least via a continuous shoulder.

12. Apparatus according to claim 1, wherein the housing interior is pressurized through hydraulic means in such a way that a pressure equalization takes place in accordance with the underwater insertion depth.

\* \* \* \* \*